Patented Sept. 7, 1943

2,328,920

UNITED STATES PATENT OFFICE 2,328,920

MANUFACTURE OF PHENOLS

Wendell William Moyer, Decatur, Ill., assignor to The Solvay Process Company, New York, N. Y., a corporation of New York No Drawing. Application July 23, 1940, Serial No. 346,999

5 Claims. (Cl. 260—621)

This invention relates to the manufacture of phenols and is particularly concerned with their manufacture by vapor phase oxidation of benzene and toluene, for instance by means of molecular oxygen.

In United States patent application Serial No. 167,252 filed October 4, 1937, there is described a non-catalytic oxidation process to which the present invention is particularly applicable. However, the present invention is also applicable to catalytic processes, such as that of United States Patent 1,547,725 of Carlisle H. Bibb involving the use of nitrogen oxide or nitric acid vapor in the oxidation zone.

The oxidation of benzene to phenol or of toluene to cresols, demands a limited oxidation of the benzene nucleus. Phenol and the cresols are readily susceptible of further oxidation to form intermediate oxidation or oxidative decomposition products and complete combustion products. Most of the materials normally employed as materials of construction, as well as the usual oxidation catalysts, accelerate oxidation of phenol to a greater extent than they accelerate oxidation of benzene and as a consequence the presence of such surfaces in the oxidation zone causes seriously reduced yields of phenol.

Vitreous materials, such as glass, appear to exert comparatively little adverse effect upon yields of phenols. However, such materials are not satisfactory materials of construction for apparatus operating at the elevated temperatures desirable for phenol production. While it is possible to employ glass coatings upon materials of construction infusible at operating temperatures, glass-coated apparatus is expensive to produce and difficult to maintain. Use of materials such as fused silica also has the disadvantage of excessive cost.

In accordance with the present invention the surfaces defining the reaction zone are coated with fused boron oxide.

The fused boron oxide, in either molten or amorphous solid form, appears to exert no deleterious effect upon the formation of phenols and therefore permits the reaction to be conducted with a maximum yield of the desired phenol. The surfaces of the reactor may be constructed of material such as silica brick or fire-brick or porcelain or steel or any other material capable of withstanding the high temperatures employed in the oxidation process. If porous materials are employed, the boron oxide tends to become absorbed into the interior of the porous mass and accordingly until the pores become thoroughly impregnated, it may be necessary to replenish the boron oxide coating from time to time in order to impregnate the porous material and to maintain an unbroken surface of boron oxide. Since the boron oxide does not exert an adverse effect upon the oxidation reaction, its use is attended by the advantage that surfaces in contact with the reaction mixture may be made as extensive as desired for securing a maximum rate of heat transfer without at the same time tending to reduce yields of phenol.

The boron oxide surfaces are readily prepared merely by distributing boron oxide (or boric acid) as a powder or as a paste upon the material of which the reaction chamber is constructed. Upon heating the chamber to a temperature in the neighborhood of 650° C. the boron oxide fuses and distributes itself over and upon the reactor surfaces so as to insulate the vapor phase reaction mixture from direct contact with such surfaces.

The adverse effects of common materials of construction are most serious at high temperatures above the melting point of boron oxide and in its preferred aspects the invention involves conducting the oxidation of benzene or toluene to phenol or cresols by means of air or equivalent gas in a reaction zone defined by surfaces solely of fused boron oxide and for the most part of molten boron oxide, only the reaction temperatures at or near the entrance and exit of the reactor being below the melting point of the boron oxide. Since the reaction is relatively slow at these lower temperatures, little reaction occurs except in the zone defined by the molten material.

The following examples will serve to illustrate the practical application of the present invention. Example 1 shows a direct comparison of the results obtained using molten boron-oxide-coated materials in place of the uncoated materials, under otherwise similar operating conditions. Examples 2 and 3 show the effectiveness of the boron oxide coatings in preventing undesired surface effects even at very high temperatures. In all of the examples the percentage conversion of benzene to phenol, A, and the percentage conversion of benzene to gaseous by-products, B, were determined. For convenience and ready comparison these data have been consolidated and the ratio of $A/(A+B)$ is given as the "efficiency rating."

Example 1

Five tests were made in a reactor comprising a glass tube of 2 cm. inside diameter and 45 cm. length. The tests were made using (1) a reaction zone free from packing, (2) a reaction zone packed with 4-6 mesh fire-brick (Harbison-Walker #116 unwashed), (3) a reaction zone packed with like 4-6 mesh fire-brick coated with 1% boron oxide, (4) a reaction zone packed with 4-6 mesh silica brick, and (5) a reaction zone packed with 4-6 mesh silica brick coated with 5½% boron oxide. The temperature was measured at the hottest point in the reactor tube and in all of the comparative tests tabulated below this temperature was within two degrees of 650° C. In each test an equimolar mixture of air and benzene was passed through the reaction zone at a rate of 45 liters of gas mixture (calculated for 0° C. and one atmosphere absolute pressure) per hour. The results of the tests indicate the deleterious effects of fire-brick and silica brick surfaces in the reaction zone and the manner in which the effects of such surfaces may be counteracted by use of boron oxide. The high value in the first column of data opposite the unpacked reactor may be explained by the long period of reaction resulting from the absence of packing.

|  | Benzene converted to phenol+gas | Efficiency rating |
|---|---|---|
|  | Per cent | Per cent |
| (1) Unpacked reactor | 8.2 | 54 |
| (2) Fire-brick | 1.4 | 8 |
| (3) Fire-brick coated with 1% $B_2O_3$ | 1.7 | 51 |
| (4) Silica brick | 1.0 | 18 |
| (5) Silica brick coated with 5½% $B_2O_3$ | 1.5 | 51 |

*Example 2*

The reactor consisted of a ½ inch inside diameter porcelain tube having a section about 12.8 inches long packed with 8-10 mesh fire-brick coated with 15% by weight of $B_2O_3$. An equimolar mixture of benzene vapor and air was passed through the packed section at a substantially constant rate of 46.4 liters of gas mixture (STP) per hour. The maximum temperature was maintained between 750° and 800° C. In a test under these conditions a conversion of about 5% of the benzene to phenol and gas was obtained with an efficiency rating of about 57%.

*Example 3*

The reactor consisted of an unpacked porcelain tube having an inside diameter of ½ inch and having the porcelain interiorly coated with boron oxide obtained by saturating the porcelain with boric acid solution and successively drying, decomposing the acid, and fusing the resulting boron oxide. An equimolar air-benzene vapor mixture was passed through the reaction zone at an hourly space velocity of 13,000 (volumes, STP). The average temperature in the reaction zone was about 805° C. and the maximum about 825–830° C. A conversion of about 4.4% of the benzene to phenol and gas was obtained with an efficiency rating of about 67%.

This application is in part a continuation of United States patent application Serial No. 167,252, filed October 4, 1937, by Wendell W. Moyer and William C. Klingelhoefer.

I claim:

1. In the manufacture of phenols by the vapor phase oxidation of a compound of the group consisting of benzene and toluene, the improvement which comprises conducting at least the major portion of said oxidation in a reaction zone wherein the reacting materials are exposed to contact substantially only with surfaces of fused boron oxide.

2. In the manufacture of phenols by the vapor phase air oxidation of a compound of the group consisting of benzene and toluene, the improvement which comprises conducting the oxidation at temperatures above the melting point of boron oxide in a reaction zone wherein substantially all surfaces exposed to contact with the reactants are molten boron oxide.

3. In the manufacture of phenol by the vapor phase oxidation of benzene by means of molecular oxygen, the improvement which comprises conducting the oxidation at temperatures above the melting point of boron oxide in a reaction zone wherein substantially all solid surfaces are coated with molten boron oxide.

4. In the manufacture of phenol by the vapor phase oxidation of benzene by means of molecular oxygen, the improvement which comprises conducting the oxidation at temperatures above the melting point of boron oxide in a reaction zone defined by a porous refractory solid of which the pores are impregnated with and of which substantially the entire surfaces exposed to contact with the reactants are coated with molten boron oxide.

5. In the manufacture of phenol by the vapor phase air oxidation of benzene, the improvement which comprises conducting the oxidation at temperatures above the melting point of boron oxide in a reaction zone defined by a porous refractory solid of which the pores are impregnated with and of which substantially the entire surfaces exposed to contact with the reactants are coated with molten boron oxide.

WENDELL WILLIAM MOYER.